(12) United States Patent
Waddington

(10) Patent No.: US 10,180,077 B2
(45) Date of Patent: Jan. 15, 2019

(54) MOVING-VANE ANGLE OF ATTACK PROBE

(71) Applicant: Meggitt (UK) Limited, Dorset (GB)

(72) Inventor: Alan Waddington, Surrey (GB)

(73) Assignee: Meggitt (UK) Limited, Dorset (GB)

( * ) Notice: Subject to any disclaimer, the term of this patent is extended or adjusted under 35 U.S.C. 154(b) by 409 days.

(21) Appl. No.: 15/173,991

(22) Filed: Jun. 6, 2016

(65) Prior Publication Data

US 2016/0356175 A1  Dec. 8, 2016

(30) Foreign Application Priority Data

Jun. 8, 2015  (GB) .................................. 1509884.1

(51) Int. Cl.
| | |
|---|---|
| *G01P 5/06* | (2006.01) |
| *G01P 5/165* | (2006.01) |
| *F01D 21/00* | (2006.01) |
| *G01P 13/02* | (2006.01) |
| *F01D 9/02* | (2006.01) |

(52) U.S. Cl.
CPC ............. *F01D 21/003* (2013.01); *F01D 9/02* (2013.01); *G01P 5/06* (2013.01); *G01P 5/165* (2013.01); *G01P 13/025* (2013.01)

(58) Field of Classification Search
None
See application file for complete search history.

(56) References Cited

U.S. PATENT DOCUMENTS

| | | |
|---|---|---|
| 2,936,617 A | 6/1960 | Beebe |
| 3,612,439 A | 10/1971 | Wingham |
| 4,378,696 A | 4/1983 | DeLeo et al. |
| 4,672,846 A | 6/1987 | LeBlond et al. |
| 4,730,487 A | 3/1988 | DeLeo |

(Continued)

FOREIGN PATENT DOCUMENTS

| | | |
|---|---|---|
| EP | 1275947 A2 | 1/2003 |
| FR | 2847672 A1 | 5/2004 |

(Continued)

OTHER PUBLICATIONS

Search Report corresponding to the European Application No. 16172987.6-1568 dated Oct. 18, 2016, twelve pages.

(Continued)

*Primary Examiner* — Andre J Allen

(74) *Attorney, Agent, or Firm* — Kilpatrick Townsend & Stockton

(57) ABSTRACT

A moving-vane angle of attack probe is provided. The moving-vane angle of attack probe comprises: a vane having opposed first and second vane surfaces that define a leading edge and a trailing edge, the first and second vane surfaces, each extending between the leading edge and the trailing edge; a first vane opening located on the leading edge; at least one exhaust opening; a vane conduit extending between the first vane opening and the exhaust opening such that the first vane opening and the exhaust opening are in fluid communication, the vane conduit defining at least an interior chamber between the first and second vane surfaces; and a pitot-tube located within the interior chamber such that in use it receives air that enters the interior chamber via the first vane opening.

20 Claims, 11 Drawing Sheets

(56) References Cited

U.S. PATENT DOCUMENTS

| | | | |
|---|---|---|---|
| 5,257,536 A | 11/1993 | Beigbeder et al. | |
| 5,731,507 A | 3/1998 | Hagen et al. | |
| 6,679,112 B2 | 1/2004 | Collot et al. | |
| 6,817,240 B2 | 11/2004 | Collot et al. | |
| 6,941,805 B2 | 9/2005 | Seidel et al. | |
| 7,155,968 B2 | 1/2007 | Collot et al. | |
| 2002/0184943 A1* | 12/2002 | Collot | G01P 5/14 73/170.02 |
| 2003/0051546 A1* | 3/2003 | Collot | G01K 13/02 73/170.02 |
| 2004/0237641 A1* | 12/2004 | Hanson | B64D 15/12 73/170.02 |
| 2004/0261518 A1* | 12/2004 | Seidel | B64D 43/02 73/182 |
| 2010/0071479 A1 | 3/2010 | Choisnet | |
| 2017/0199218 A1* | 7/2017 | Benning | G01P 21/00 |

FOREIGN PATENT DOCUMENTS

| | | | |
|---|---|---|---|
| WO | WO01/67115 A2 | 9/2001 | |
| WO | WO-2005054874 A1 * | 6/2005 | B64D 43/02 |

OTHER PUBLICATIONS

Search Report corresponding to GB 1509884.1 dated Dec. 14, 2015, four pages.

* cited by examiner

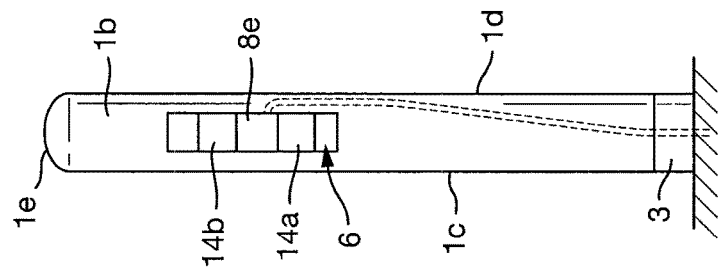
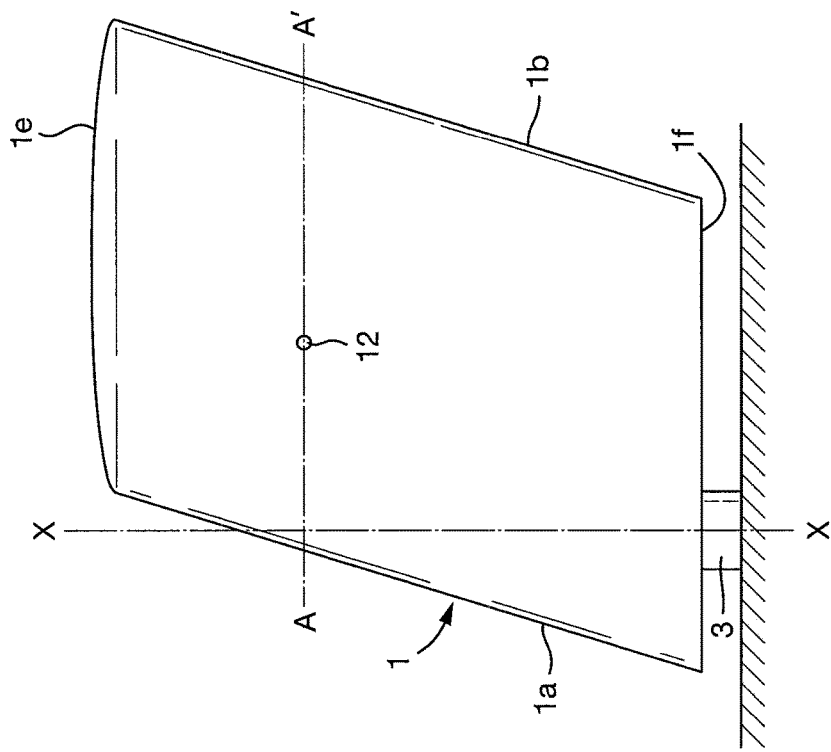
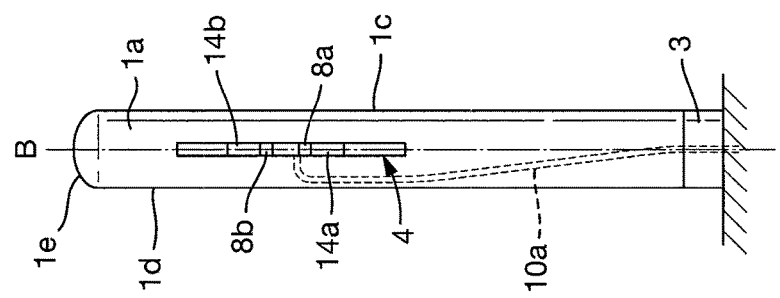

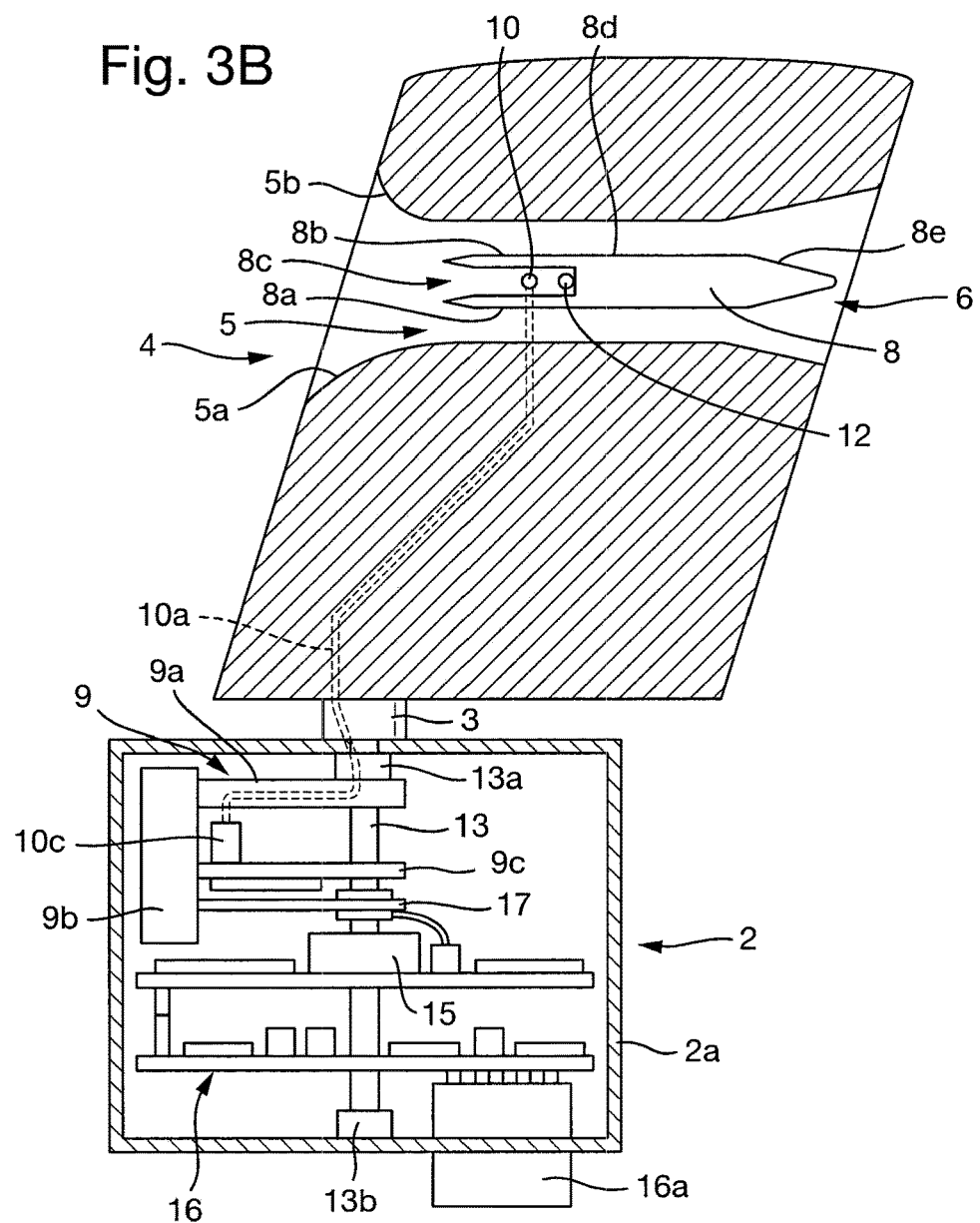

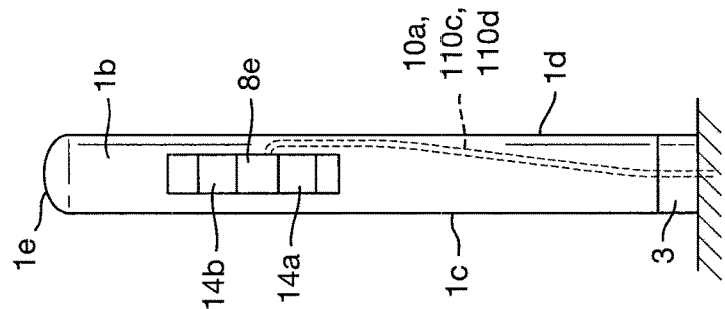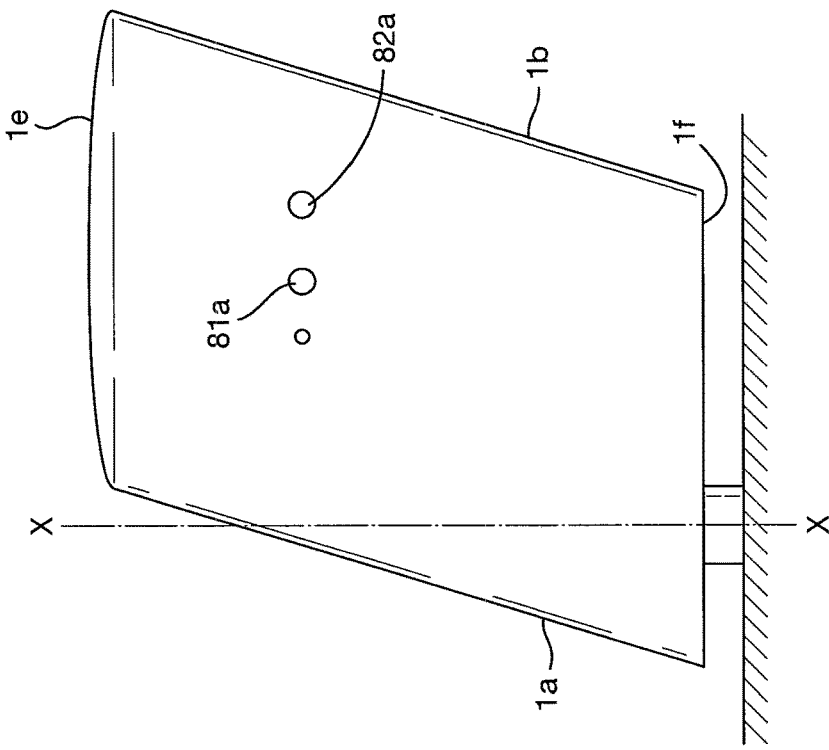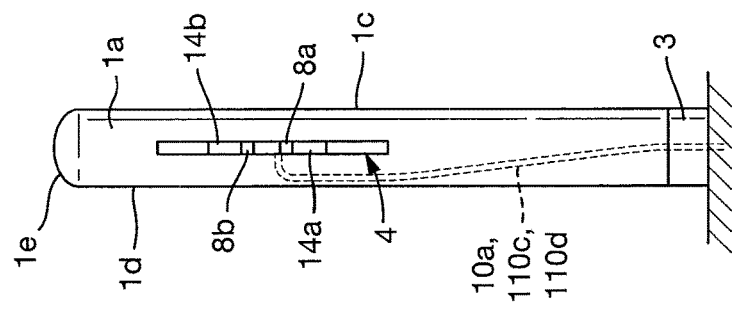

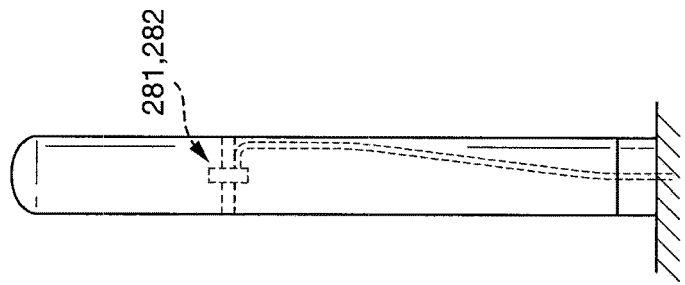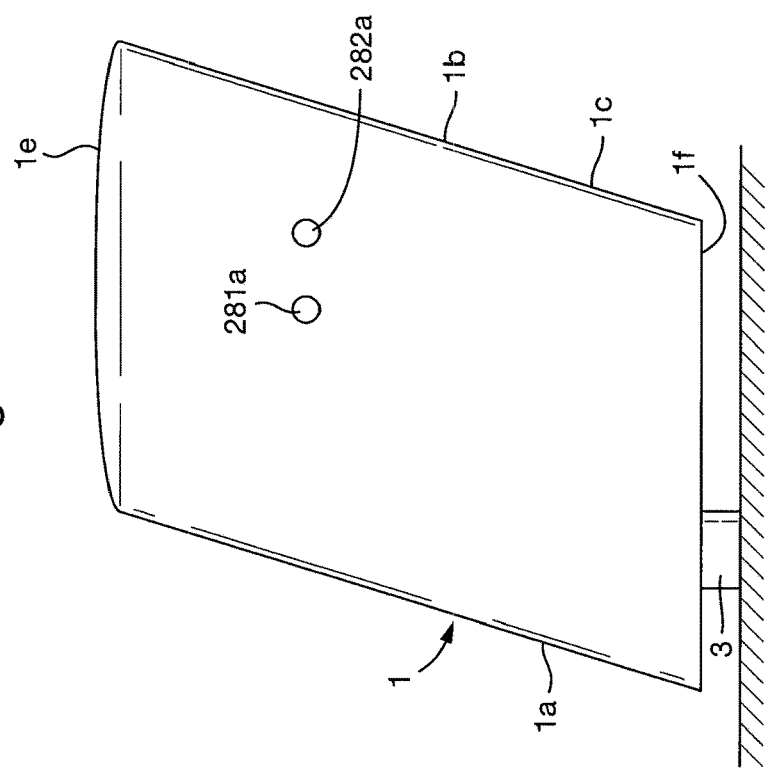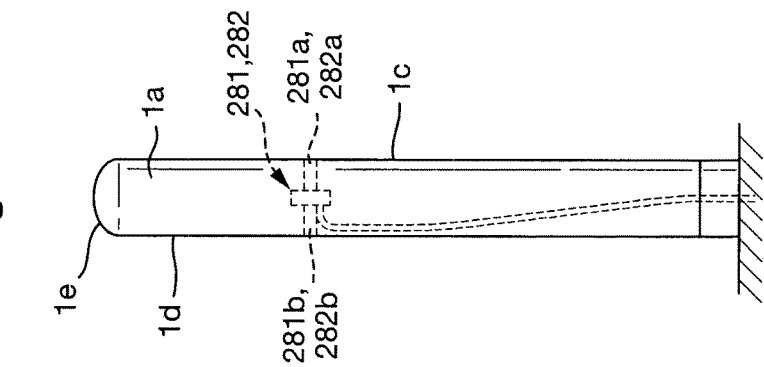

MOVING-VANE ANGLE OF ATTACK PROBE

FIELD OF THE INVENTION

The present invention is directed to a moving-vane angle of attack probe.

DESCRIPTION OF THE RELATED ART

Conventionally, aircraft have been fitted with separate air data sensors for measuring pitot-static pressure, angle of attack and temperature. This results in a fairly complex installation, with each sensor requiring power, data communications and in the case of pitot-static systems, pneumatic connections. To reduce system complexity, multi-function probes have been produced which perform the functions of two or more of these sensors, usually with integral measurement and processing capability.

In particular, moving-vane angle of attack probes have been integrated with pitot-static pressure sensors by mounting a conventional pitot-tube on the top of a moving vane. Examples of such probes may be found in U.S. Pat. No. 4,672,846 A, U.S. Pat. No. 6,679,112 BB, U.S. Pat. No. 6,817,240 BB, and U.S. Pat. No. 7,155,968 BB. Alternatively, probes with separate pitot-static and vane subassemblies have been proposed, as described in U.S. Pat. No. 6,941,805 BB. In both these cases, the integrated sensors have a large surface area and require significant de-icing power to maintain functionality of the probe.

An alternative approach has been to add additional pressure ports to a conventional pitot-static probe and use differential pressure measurements to calculate angle of attack, as described in U.S. Pat. No. 4,378,696 A. These probes also require considerable de-icing power and additionally have the disadvantage that the angle of attack measurements are not independent of the pitot-static pressure measurements, which could result in a common mode failure affecting both the air data system and the stall warning system.

It is therefore desirable to produce a multi-sensor probe that overcomes the various shortcomings of the state of the art.

SUMMARY OF INVENTION

In accordance with a first aspect of the present invention, a moving-vane angle of attack probe is provided, the probe comprising: a vane having opposed first and second vane surfaces that define a leading edge and a trailing edge, the first and second vane surfaces, each extending between the leading edge and the trailing edge; a first vane opening located on the leading edge; at least one exhaust opening; a vane conduit extending between the first vane opening and the exhaust opening such that the first vane opening and the exhaust opening are in fluid communication, the vane conduit defining at least an interior chamber between the first and second vane surfaces; and a pitot-tube located within the interior chamber such that in use it receives air that enters the interior chamber via the first vane opening.

The present inventor has identified that a reduction in the de-icing power required by a multi-sensor probe may be achieved by reducing the total surface area of the probe. The inventor then recognised that, for angle of attack and total pressure sensing probe, this could be achieved by positioning a pitot-tube, which requires significant de-icing power, inside the body of a moving-vane. The present inventor also identified that this further contributed to reducing the required de-icing power as the heat that radiates outwards as the pitot-tube is de-iced can now be used to de-ice the surrounding vane.

Preferably the interior chamber is defined by an upper interior chamber wall, a lower interior chamber wall, first interior chamber sidewall and second interior chamber sidewall, and more preferably at least one and preferably each of these walls extends from the opening in the leading edge of the vane. While preferable, it will be appreciated that the opening, subsequent vane conduit and internal chamber may be defined in numerous different ways.

Embodiments in which the interior chamber walls define the opening on the leading edge of the vane promote a smooth flow of air back into the interior chamber such that the air sampled by the pitot-tube accurately reflects the air flow towards the probe.

In some embodiments, the exhaust opening is located on the trailing edge. An exhaust on the trailing edge ensures that air flowing out of the exhaust opening will not affect the angle of attack reading produced by the probe. While this is preferable, other embodiments are foreseen, including for example embodiments in which first and second exhaust openings are located on the first and second vane surfaces.

Preferably, the upper interior chamber wall, lower interior chamber wall, first interior chamber sidewall and second interior chamber sidewall each extend from the opening on the leading edge of the vane to the exhaust opening on the trailing edge so as to define the interior chamber across the whole of the length of the vane.

Preferably the opening in the leading edge of the vane is a slot opening configured to extend along the leading edge. While preferable, other embodiments are foreseen in which, for example, the opening is substantially cylindrical.

Similarly, it is preferable that the exhaust opening is also a slot opening, which is configured to extend along the trailing edge.

In particularly preferable embodiments, the pitot-tube comprises: a first shielding wall extending substantially between the first and second sidewalls of the interior chamber; a second shielding wall extending substantially between the first and second sidewalls of the interior chamber, wherein the first shielding wall and the second shielding wall are spaced apart from each other to define a first sensor opening therebetween; a rear wall extending between the first shielding wall and the second shielding wall, and substantially between the first and second sidewalls of the interior chamber; and a first pressure conduit located between the first sensor opening and the rear wall, wherein the first pressure conduit is configured to transmit a pressure between the first and second shielding walls.

The above described pitot-tube construction may be considered to be a "two-dimensional" shielded pitot-tube. A two-dimensional pitot-tube refers to a pitot-tube that does not exhibit rotational symmetry and, more specifically, one which is described by extrusion of a two-dimensional design. The present inventor identified that, because the vane is configured to rotate about an axis, the rotational symmetry of a conventional shielded pitot-tube is no longer necessary since the direction of air flow will lie in a plane that is parallel to the vane. Any direction of air flow other than this would cause the vane to rotate until the direction of air flow was once again parallel with this plane. Embodiments which use the two-dimensional pitot-tube design have a simplified construction when compared to embodiments which use spherical shielded pitot-tubes. It is also preferable that the pitot-tube be shielded in this way so that the total pressure measurement is insensitive to local angle of side-slip. Here, total pressure refers to the air pressure between the two shielding walls when air flowing into the pitot-tube hits the rear wall of the sensor, and is a combination of the static pressure or freestream pressure and the dynamic pressure.

It is further preferable that the first sensor opening faces the first vane opening. This arrangement allows air to flow directly through the vane opening and into the sensor opening without any significant interaction with the vane. While preferable, other embodiments are foreseen in which the sensor opening does not directly face the vane opening.

It is also preferable that first and second bypass channels are defined between the first shielding wall and the lower interior chamber wall, and the second shielding wall and the upper interior chamber wall respectively, and wherein the bypass channels are configured such that, in use, a portion of the air that enters the interior chamber is directed along the first and second bypass channels without entering the pitot-tube.

The provision of bypass channels between the shielding walls and the interior chamber walls ensures that the sensor opening does not sample the turbulent air that flows immediately beside the interior chamber walls. Instead, the sensor opening samples only a middle portion of the air flowing through the interior chamber. While preferable, embodiments are foreseen which do not feature bypass channels.

Preferably, the pitot-tube further comprises first and/or second drain holes located between the first sensor opening and the rear wall, the drain holes extending through the first and/or second vane surface. The drain holes act to remove ingested water and melted ice from the pitot-tube.

So that the vane can travel at speeds in excess of Mach 1, it is preferable that the leading edge is at an angle to an axis of rotation of the vane, and in particular, it is preferable that the vane is in a swept back configuration, as opposed to a swept forward configuration.

The provision of a swept vane results in a cross-flow along the edge of the vane. With the vane opening located on the leading edge, this results in air flowing into the opening at an angle to the direction of travel. The inventor identified that it is therefore preferable that the vane conduit tapers inwardly as it extends from the vane opening. By providing that the vane conduit tapers inwardly, the leading edge effectively curves smoothly into the opening, and the air flow into the interior chamber may be straightened so that the pitot-tube samples air which correctly reflects the direction and speed of the air flowing towards the vane. In these embodiments, the leading edge may transition into one or both of the upper or lower interior chamber walls on one or both sides of the opening, so that the air is guided into the interior chamber as smoothly as possible.

Preferably, a distance between the upper and lower interior chamber walls decreases as the upper and lower interior chamber walls extend away from said vane opening, and preferably the upper and lower interior chamber walls taper inwardly as they extend from away from said vane opening. While only the leading edge on the upstream side of the opening need curve or taper to correct for cross-flow, it is preferable that both sides taper.

The inventor also identified that it is preferable that the integrated probe be able to provide static pressure measurements as well as total pressure and angle of attack measurements. Therefore, in some embodiments, the pitot-tube is a pitot-static tube. While this could take the form of a conventional pitot-static tube housed within the interior chamber, in some particularly preferable embodiments, the probe further comprises at (least a first static pressure system, said first static pressure system comprising at least a first static pressure port that opens through one of the first and second vane surfaces, and a first static pressure conduit in fluid communication with the first static pressure port. More preferably, the static port is in fluid communication with a first manifold internal to the vane, and the first static pressure conduit is configured to open into the first manifold and to transmit a static pressure in the first manifold.

By providing one static pressure port on one side of the vane, it is possible that, if the rotation of the vane lags behind a change in wind direction, a defect due to the increased or decreased pressure on that side of the vane could affect the accuracy of the static pressure measurement. It is therefore preferable that the probe further comprises a second static pressure port in the other vane surface, the second static pressure port being in fluid communication with the first manifold such that the first manifold is connected to the atmosphere on either side of the vane. With this configuration, the pressure in the first manifold is an average of the pressures on either side of the vane, and so a defect due to the vane lagging behind a change in wind direction is cancelled out.

In static pressure probes, redundancy is desirable, and so particularly preferable embodiments further comprise a second static pressure system. The second static pressure system may be formed similarly to that of the first, with either one or two static pressure ports and preferably with a second manifold.

The present inventor has identified that, in embodiments which feature a static pressure system, a defect in the static pressure measurements will exist which is caused by the change in air pressure as it flows around the vane, thereby affecting the air pressure in the region of the static pressure port. He has further identified that this defect can be corrected for by shaping the vane. It is therefore preferable that at least the first static pressure port is located in a depression in the first or second vane surface, and further preferable that each static pressure port is located in a separate depression in the first or second vane surface. While it is preferable that each pressure port is located in a separate depression, it is also possible that multiple ports could be located in a single, larger depression in the surface of the vane.

In particularly preferable embodiments, the depression is a groove which runs up the first or second vane surface. The depression in the surface of the vane changes the pressure of the air in the region of the static pressure port as the air flows over the vane. The precise dimensions of the depression can be selected so that, at all velocities, the air pressure in the region of the static pressure port substantially reflects the freestream pressure (ignoring other pressure defects that will be discussed in more detail later).

As previously mentioned, the moving-vane angle of attack probe of the present invention advantageously reduces the de-icing power required. In particularly preferable embodiments, the de-icing is performed by at least one heat source disposed between the first and second vane surfaces. The at least one heat source is able to perform the de-icing of both the external surface of the vane and the pitot-tube and static pressure systems in an efficient manner. Preferably, the heat source comprises a foil heater and/or a ceramic heater, and further preferably the at least one heat source includes a first heater located between the first and second vane surfaces, wherein the first heater extends across substantially all of the area of the first or second vane surface and/or a second heater located proximate the interior chamber.

In further preferable embodiments, the moving-vane angle of attack probe further comprises an electronics assembly for taking angle of attack and/or pressure readings, the electronics assembly having an external housing, wherein the vane is connected to the electronics assembly external housing by a pivot, and wherein the vane is configured to rotate relative to the electronics assembly external housing.

In particularly preferable embodiments, a counterweight system is located inside the electronics assembly external housing, the counterweight system being fixedly connected to the vane through the pivot. The counterweight system prevents the weight of the vane itself affecting the angle of attack measurement, and is advantageously contained in the electronics assembly for a compact design.

In some embodiments, the first conduit is configured to transmit the first pressure through the pivot and to a first pressure sensor located in the electronics assembly external housing. While preferable, it is foreseen that other embodiments will exist that have, for example, a pressure sensor located in the vane itself.

In particularly preferable embodiments, the first pressure sensor is located on the counterweight system. Such embodiments are particularly preferable for two reasons. Firstly, it is preferable to have the pressure sensor fixed relative to the vane so as to simplify communication of air pressure. Secondly, the weight of the total pressure sensor can be used to contribute to the total weight of the counterweight system.

In some embodiments, the electronics assembly further comprises a computer fixedly mounted in the electronics assembly housing for processing the sensor measurements. While preferable, it is also foreseen that embodiments exist in which the sensor measurements are communicated outside of the probe for processing.

Preferably the first pressure sensor communicates via at least one of a slip ring and a rotary transformer. In embodiments in which a computer is present, preferably the first pressure sensor communicates with the computer via the slip ring and/or rotary transformer In embodiments which include static pressure systems, it is preferable that the first static pressure conduit transmits a first static pressure to a first static pressure sensor located in the electronics assembly external housing, and, if present, that the second static pressure conduit transmits a second static pressure to a second static pressure sensor located in the electronics assembly external housing in a way similar to the above first pressure conduit.

According to a second aspect of the present invention, a moving-vane angle of attack probe comprises a vane having opposed first and second vane surfaces that define a leading edge and a trailing edge, the first and second vane surfaces, each extending between the leading edge and the trailing edge; a first depression formed in the first vane surface; and a first static pressure system, said first static pressure system comprising at least a first static pressure port configured to open through said first vane surface in the region of said first depression, and a first static pressure conduit configured to transmit a static pressure; wherein the first depression is configured such that, in use, air flowing over said first vane surface undergoes a change in pressure in the region of said first static pressure port.

In these embodiments, the moving vane angle of attack probe provides angle of attack measurements and static pressure measurements. These embodiments also provide the same benefits of reduced de-icing power as the first aspect by allowing for a reduced surface area and efficient arrangement of features. These embodiments further include at least one pressure system which has a static pressure defect corrected by a shaped vane surface. Specifically, the correction is performed by positioning the static pressure port in a depression in the surface of the vane, as described above with respect to the first aspect.

As described with respect to the first aspect, preferably the first static pressure system further comprises a first manifold internal to the vane, wherein the first static pressure port is configured to open into the first manifold, and wherein the first static pressure conduit is configured to open into the first manifold and configured to transmit a static pressure in the first manifold.

Preferably the first depression is a first groove that extends along the first vane surface, and more preferably, the first groove runs substantially parallel to the leading edge of the vane. While preferable, other forms of depression which correct for a static pressure defect are also foreseen.

As described with respect to the first aspect, the first pressure system may comprise either one or two static ports. Further, the vane may comprise a second static pressure system with one or two ports, as described above.

Preferably each static port is located in a depression which corrects a static pressure defect caused by air flowing over the surface of the vane.

In certain preferable embodiments, the probe may further comprise an electronics assembly, similarly to as described above with respect to the first aspect.

According to a third aspect, there is provided a vehicle comprising the moving-vane angle of attack probe according to either the first or second aspect, wherein preferably the vehicle is an aircraft.

BRIEF DESCRIPTION OF THE DRAWINGS

Some examples of moving-vane angle of attack probes according to the invention will now be described with reference to the accompanying drawings in which:

FIGS. 2A, 2B, and 2C are front, side, and rear end views respectively of the moving-vane angle of attack probe shown in FIG. 1 with the electronics assembly omitted;

FIGS. 3A and 3B are cross-sectional and longitudinal sectional views respectively of the moving-vane angle of attack probe shown in FIGS. 1, and 2A to 2C;

FIGS. 6A, 6B, and 6C are front, side, and rear end views respectively of the moving-vane angle of attack probe shown in FIGS. 4 and 5 with the electronics assembly omitted;

FIGS. 9A, 9B, and 9C are front, side, and rear end views respectively of the moving-vane angle of attack probe shown in FIG. 8 with the electronics assembly omitted;

DETAILED DESCRIPTION

Figure 1:
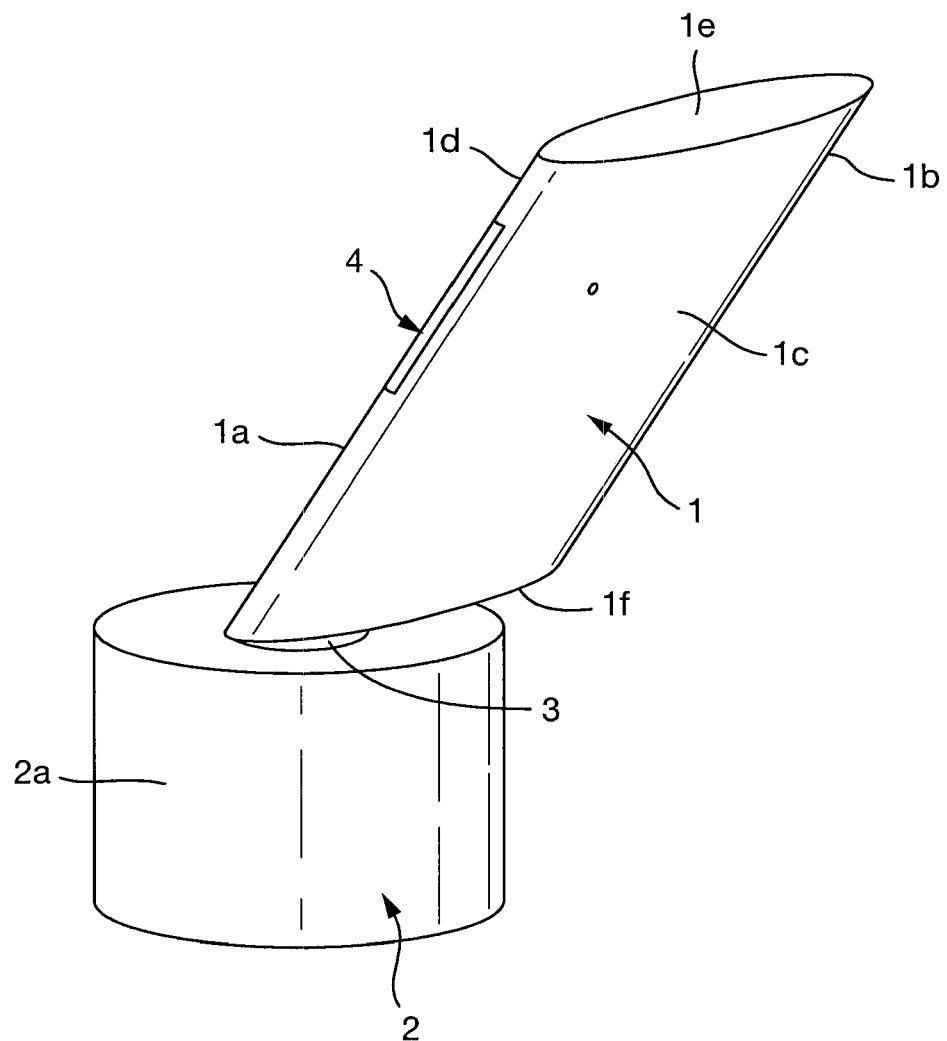
FIG. 1 is a perspective view of a moving-vane angle of attack probe according to a first embodiment.

The moving-vane angle of attack probe shown in FIGS. 1 to 3B comprises a vane 1. The vane 1 is made up of a leading edge 1a, trailing edge 1b, and first and second vane surfaces 1c, 1d that extend between the leading edge and the trailing edge on opposing sides to define the vane. The first and second vane surfaces meet at a top edge 1e of the vane 1, the top edge extending from a first end of the leading edge 1 to a corresponding first end of the trailing edge 1b. In alternative embodiments, a top edge surface may instead extend between the first and second vane surfaces along the top edge. The vane is closed along a bottom edge 1f by a bottom edge surface that is substantially planar and covers an area between the first and second vane surfaces 1c, 1d at a second end of the leading and trailing edges 1a, 1b.

In this embodiment, the distance between the leading edge 1a and trailing edge 1b in a direction parallel to the intended direction of travel is approximately 100 mm. The height of the vane, which is to say the distance between the top edge 1e and bottom edge 1f, in a direction perpendicular to the intended direction of travel is approximately 130 mm. The distance between the first and second vane surfaces 1c, 1d varies between the leading edge and the trailing edge, with the greatest distance between the two being approximately 14.6 mm.

The vane 1 is connected to an electronics assembly 2 via a pivot 3 which extends through a top surface of the electronics assembly. An integrally formed pivot attachment flange 3a (shown in FIG. 4) extends from the bottom edge 1f of the vane, and connects the vane to the pivot 3 such that the vane can pivot freely about an axis X that is substantially perpendicular to the top and bottom edges 1e, 1f. The pivot 3 is located such that the axis of rotation X is closer to the leading edge 1a than the trailing edge 1b. The pivot 3 allows the vane 1 to rotate as the assembly moves through the air in order to align the leading and trailing edges 1a, 1b with the oncoming wind so that the angle of attack may be determined.

The pivot 3 is connected to a shaft 13 which extends through the electronics assembly 2, and is mounted on first and second bearings 13a, 13b at opposing inside walls of the electronics assembly. A counterweight system 9 extends laterally from the shaft, fixed with respect to the vane, and is configured to counter the mass of the vane 1 which is primarily on one side of the axis X. The electronics assembly is described in more detail below.

In this embodiment the vane is "swept back", which is to say that leading edge 1a makes an angle with the axis of rotation X, and in particular the leading edge runs along a direction which has a component, perpendicular to the axis of rotation X, that points towards the trailing edge 1b. The angle that the leading edge makes with the axis of rotation provides that the vane can travel at speeds of Mach 1 or higher by ensuring subsonic flow over the leading edge in transonic and supersonic flight. Further, the swept back configuration provides that of the centre of pressure is located behind the axis of rotation, increasing the stability of the vane. In this embodiment an angle of approximately 35° is used, however it will be appreciated that other angles will also be suitable depending on the desired maximum operational speed.

In this embodiment, the trailing edge 1b extends substantially parallel to the leading edge 1a such that the vane has a substantially parallelogram shape when viewed in a side view. However, in other embodiments, the trailing edge 1b may, for example, be parallel to the axis of rotation X.

The moving-vane angle of attack probe according to the invention further includes a total pressure system internal to the vane 1 for determining a total pressure, which will now be described in detail.

The leading edge 1a features an opening 4 on the leading edge of the vane. In this embodiment, the opening 4 has a substantially rectangular profile, and is configured so that the long edge of said rectangle runs along the leading edge 1a to define a slot in the leading edge 1a of the vane.

In this embodiment, the opening 4 has a length of approximately 48 mm along the leading edge, and a width of approximately 2 mm.

The opening 4 on the leading edge 1a opens into an interior chamber 5 located between the first and second vane surfaces 1c, 1d. The interior chamber 5 runs from the leading edge 1a across the vane to an exhaust opening 6 located in the trailing edge 1b. The opening 4 is thereby in fluid communication with said exhaust opening 6 via the interior chamber 5.

In this embodiment, the exhaust opening 6 has a substantially rectangular profile, and is configured so that the long edge of said rectangle runs along the trailing edge 1b to define a slot in the trailing edge 1b of the vane. In this embodiment, the exhaust opening has a length of approximately 48 mm along the trailing edge, and a width of approximately 3 mm.

The opening 4 and exhaust opening 6 have an area ratio of approximately 4:6 (i.e. 96 $mm^2$:144 $mm^2$), which has been found to be advantageous to obtain pressure recovery at low airspeeds.

The interior chamber 5 is defined by four interior chamber walls 5a, 5b, 5c, 5d, which extend between the opening 4 and the exhaust opening 6. The first and second opposing interior chamber walls 5a, 5b extend from the shorter sides of the opening 4 to the corresponding shorter sides of the exhaust opening. The third and fourth opposing interior chamber walls 5c, 5d extend from the longer sides of the opening 4 to the corresponding longer sides of the exhaust opening 6. The arrangement of the interior chamber walls 5a, 5b, 5c, 5d results in the interior chamber having a substantially rectangular cross-section.

At the mid-section of the interior chamber, where each interior chamber walls is running substantially parallel to its opposing wall, the distance between the first and second interior chamber walls is approximately 20 mm in a direction perpendicular to the direction of travel, and the distance between the third and fourth interior chamber walls is approximately 3 mm, giving the interior chamber a cross-sectional area of approximately 60 $mm^2$. However, as will be described below, large portions of this cross-sectional area will be occupied by a pitot-tube along the interior chamber.

The first and second interior chamber walls 5a, 5b are shaped so as to curve in from the opening 4 before each running substantially parallel to the top and bottom edges. The curve of first and second interior walls reduces the distance therebetween as they proceed from the opening 4 into the body of the vane, before the walls run substantially parallel with each other towards the exhaust opening.

The precise curvature of the first interior chamber wall 5a, which is the wall closest to the bottom edge 1f of the vane, is selected in response to the cross-flow that will exist along the leading edge 1*a* of the vane as the vane travels at high speed through the air. The curvature is configured to straighten the flow direction of air entering the opening 4 so that the air speed and direction inside the interior chamber are not distorted by the cross-flow along the leading edge 1*a* which would act to introduce air into the opening at an angle to the actual wind direction. The degree of cross-flow along the leading edge will depend on, in particular, the angle which the leading edge makes with the intended direction of travel. The curvature must therefore be selected based on the shape of the vane in order to achieve the above described straightening effect.

In this embodiment, the second interior chamber wall 5*b*, which is the wall closest to the top edge 1*e* of the vane, is also curved, however this is not essential to preventing a distortion due to cross-flow. Instead, a curved second interior chamber wall is preferable to, for example, a sharp angle between the leading edge 1*a* and the second interior chamber wall 5*b* as a curved surface helps prevent icing occurring in the region of the opening 4. The precise curvature of the second interior chamber wall 5*b* is selected to ensure the smooth flow of air into the interior chamber.

As mentioned above, the first and second interior chamber walls 5*a*, 5*b* curve in from the opening 4 and then run substantially parallel to each other towards the exhaust opening 6 located on the trailing edge 1*b*. In this embodiment, after running substantially parallel across most of the width of the vane, the first and second interior chamber walls 5*a*, 5*b* are then configured to taper outwards as they approach exhaust opening 6.

The third and fourth interior chamber walls 5*c*, 5*d* are, for the most part, planar between the opening 4 and the exhaust opening 6, and substantially parallel with each other. However, the third and fourth interior chamber walls 5*c*, 5*d* taper away from each other as they proceed from the opening 4 into the body of the vane to increase the distance therebetween from 1.5 mm, as it is at the opening 4, to 3 mm, as it is along the majority of the interior chamber.

As part of the total pressure system, a pitot-tube 8 is located inside the interior chamber 5 defined by the four interior chamber walls as described above. While a conventional, cylindrical shielded pitot-tube may be placed inside the chamber, the inventor has identified a preferable pitot-tube arrangement, used in this embodiment and discussed in more detail below.

Because the vane is configured to rotate about an axis X, the rotational symmetry of a conventional shileded pitot-tube is no longer necessary since the direction of air flow will lie in a plane that is parallel to the vane. Any direction of air flow other than this would cause the vane to rotate until the direction of air flow was once again parallel with this plane. Embodiments may therefore instead use a "two-dimensional" pitot-tube.

Here a two-dimensional pitot-tube refers to a pitot-tube that does not exhibit rotational symmetry and, more specifically, one which is described by extrusion of a two-dimensional design.

The two-dimensional pitot-tube 8 is located in the interior chamber 5, with the front-most part of the pitot-tube being located spaced back from the opening 4, at a position in-between the first and second interior chamber walls as they begin to run parallel with each other. The pitot-tube 8 comprises first and second shielding walls 8*a*, 8*b* which run in parallel with each other and substantially parallel with the first and second interior chamber walls 5*a*, 5*b*, in a direction along the interior chamber 5. The first and second shielding walls 8*a*, 8*b* are spaced apart from each other, the first shielding wall 8*a* being closer to the first interior chamber wall 5*a*, and the second shielding wall 8*b* being closer to the second interior chamber wall 5*b*. Each shielding wall extends from the third interior chamber wall 5*c* to the fourth interior chamber wall 5*d* to define three separated channels in the interior chamber 5. The first and second shielding walls define a pitot-tube opening 8*c* therebetween, the pitot-tube opening substantially facing the opening 4. The pitot-tube opening is centred approximately 80 mm above the bottom edge of the vane 1*f*. A pitot-tube rear wall 8*d* extends from the first shielding wall 8*a* to the second shielding wall 8*b*, and from the third interior chamber wall 5*c* to the fourth interior chamber wall 5*d* at a position spaced back from the pitot-tube opening 8*c* to close the channel between the two shielding walls and allow for the total pressure to be sampled between the two shielding walls 8*a*, 8*b*. First and second bypass channels 14*a*, 14*b* are defined between the first shielding wall 8*a* and the first interior chamber wall 5*a*, and the second shielding wall 8*b* and the second interior chamber wall 5*b* respectively. The frontmost ends of the shielding walls 8*a*, 8*b* each narrow to a point so as to smoothly divide air flow to either side, either into the pitot-tube opening or one of the first and second bypass channels 14*a*, 14*b*. This arrangement of shielding walls 8*a*, 8*b* defining a pitot-tube opening 8*c* and first and second bypass channels effectively allows the pitot-tube to sample a central, relatively uniformly flowing portion of the air moving through the interior chamber 5 while allowing the more turbulent air near the sidewalls to pass through the bypass channels 14*a*, 14*b* to the exhaust opening 6.

The distance between the first and second interior chamber walls 5*a*, 5*b* and the respective first and second shielding walls 8*a*, 8*b* is approximately 4 mm, giving the bypass channels a cross-sectional area of approximately 12 mm$^2$. Each shielding wall extends another approximately 4 mm away from their respective first and second interior chamber wall, leaving approximately 4 mm therebetween which defines the pitot-tube opening 8*c*, which therefore also has a cross-sectional area of approximately 12 mm$^2$.

The cross-sectional area of the bypass channels result in a ratio of the area of the opening to the area of each bypass channel of 4:1, and a ratio of the area of the exhaust opening to the area of each bypass channel of 6:1. These area ratios are particularly advantageous because the former allows a convergent inlet for flow straightening without causing stalling of the air flow in the bypass channels 14*a*, 14*b*, and the latter allows a divergent outlet for pressure recovery to ambient pressure.

The pitot-tube 8 further comprises a solid end 8*e* located behind the rear wall 8*d*, between the two bypass channels 14*a*, 14*b* which is aerodynamically shaped and extends towards the exhaust opening 6.

A total-pressure sensor port 10 opens into the channel between the first and second shielding walls 8*a*, 8*b* of the pitot-tube 8 from either of the third or fourth interior chamber walls 5*c*, 5*d*. While in this embodiment the port opens from the third or fourth interior chamber wall, it will be appreciated that the port could also be located in either the first or second shielding walls 8*a*, 8*b*. The total-pressure sensor port 10 is a circular opening with diameter of approximately 3 mm, and is connected via a total-pressure tube 10*a* to a pressure sensor 10*c* located in the electronics assembly 2. The tube extends from the interior chamber wall 5*c*, 5*d*, internal to the vane, to the pivot 3. The tube passes through the centre of the pivot and the shaft 13 and into the electronics assembly 2. The tube 10*a* communicates the pressure in the pitot-tube 8 to the pressure sensor 10*c*, which is located on the counterweight system 9 in order to minimise the weight of the moving-vane angle of attack probe as a whole.

In this embodiment, the vane includes the preferable feature of drain holes 12. Each drain hole extends from the first or second vane surface 1c, 1d to the respective third or fourth interior chamber wall 5c, 5d such that it opens into the interior chamber at a position between the two shielding walls 8a, 8b of the pitot-tube 8. In this embodiment the drain holes are located between the rear wall 8d and the total-pressure sensor port 10. The drain holes act to remove ingested water and melted ice from the pitot-tube 8. Each drain hole has a circular cross-section and is approximately 0.6 mm in diameter.

The electronics assembly will now be described in more detail with particular reference to FIGS. 3A and 3B. In this embodiment, the electronics assembly comprises a substantially cylindrical housing 2a located below the bottom edge 1f of the vane 1. As described above, the shaft 13 runs through the electronics assembly, coaxially with the cylindrical housing, and is mounted therein by bearings 13a, 13b located on the upper and lower internal surfaces of the housing 2a. The shaft 13 extends through the upper surface of the electronics assembly housing to connect to the vane 1 via pivot 3 so that the shaft rotates as the vane rotates.

A high resolution rotary encoder 15 is positioned approximately halfway down the length of the shaft 13 and is configured to accurately and precisely determine the angle of attack by detecting the rotational position of the shaft. While a high resolution rotary encoder 15 is used in this embodiment, other means may be used for detecting the rotation of the shaft, including for example a resolver.

An air-data computer 16 is located below the encoder 15, stationary relative to the electrical assembly housing 2a, and is configured to receive and process the readings from the encoder to determine the angle of attack. The air-data computer further comprises a connector 16a which allows the electronics assembly to be connected to and communicate with external electronics such as, for example, other moving-vane angle of attack probes.

As mentioned above, the electronics assembly 2 further houses a counterweight system 9. The counterweight system 9 is fixedly connected to the shaft 13 and comprises at least one counterweight arm 9a, which extends away from the shaft, and hence the axis of rotation X, in a direction opposite to the direction the vane extends from the axis of rotation. The counterweight system further has a counterweight mass 9b at the end of the counterweight arm 9a. The mass distribution of the arm and counterweight are configured to substantially balance the mass distribution of the vane relative to the axis of rotation X.

In this embodiment, the pressure sensor 10c is located on the counterweight system 9 so that the mass of the sensor can be used to contribute to balancing the mass of the vane 1. Further, because the counterweight system 9 rotates as the vane rotates, the need for leakage-prone pneumatic rotary joints is removed. The pressure sensor 10c sits on a second counterweight arm 9c which extends from the shaft 13 directly below the first counterweight arm 9a. As mentioned above, tube 10a connects the port 10 to the pressure sensor 10c. In this embodiment, the tube 10c passes through the centre of the pivot into the electronics assembly 2 where it passes through the counterweight arm 9a and down to connect with the pressure sensor 10c mounted directly below, on the second counterweight arm 9c. To minimise the length of the tube 10a, the counterweight system 9 is mounted at the very top of the shaft 13, with the encoder 15 and the air-data computer 16 mounted below. The pressure signal from the pressure sensor 10c is transferred to the air-data computer 16 through slip rings 17 mounted on the shaft 13, directly below the second counterweight arm 9c.

Figure 4:
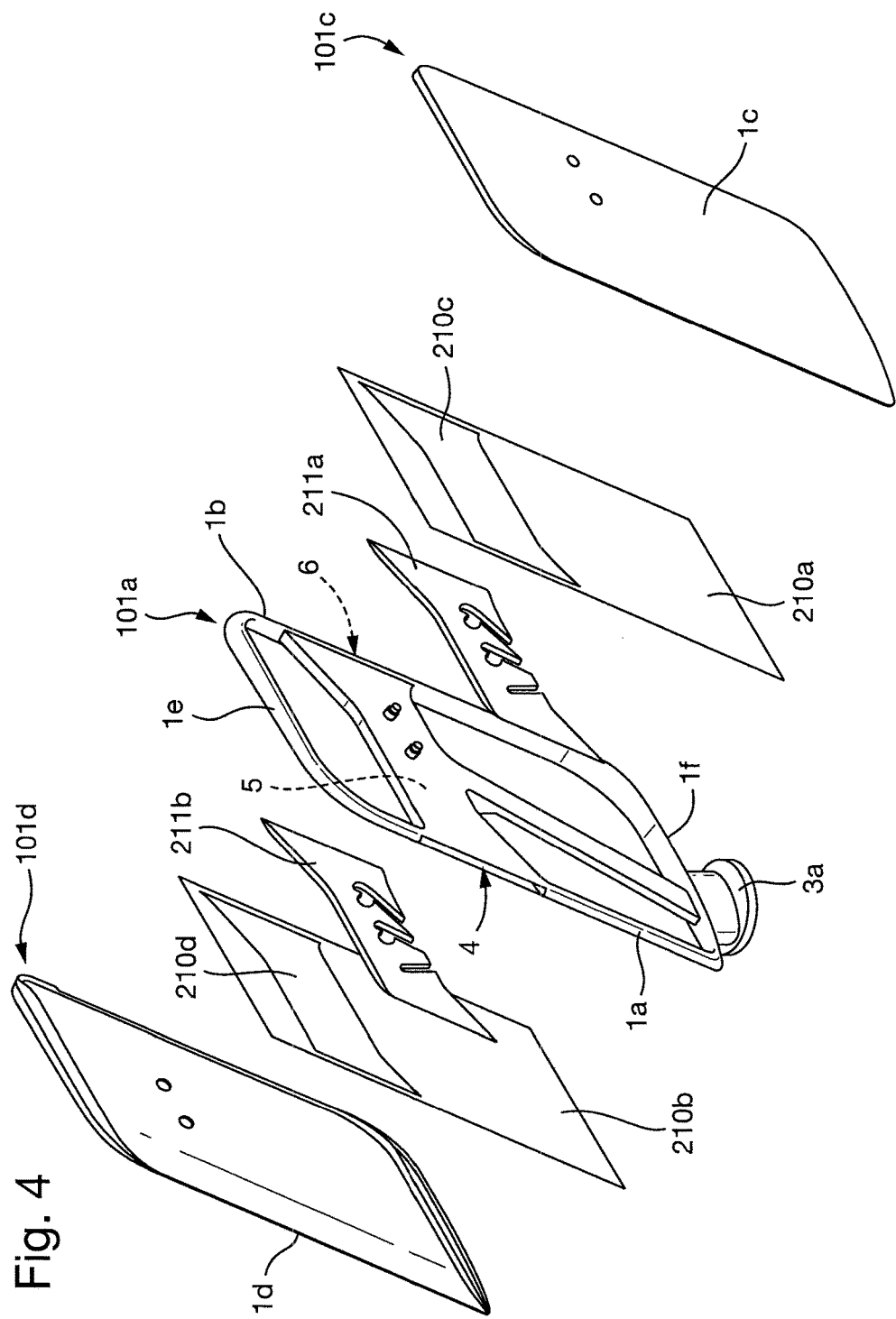
FIG. 4 is an exploded perspective view of a moving-vane angle of attack probe according to a second embodiment, with the electronics assembly omitted.
Figure 5:
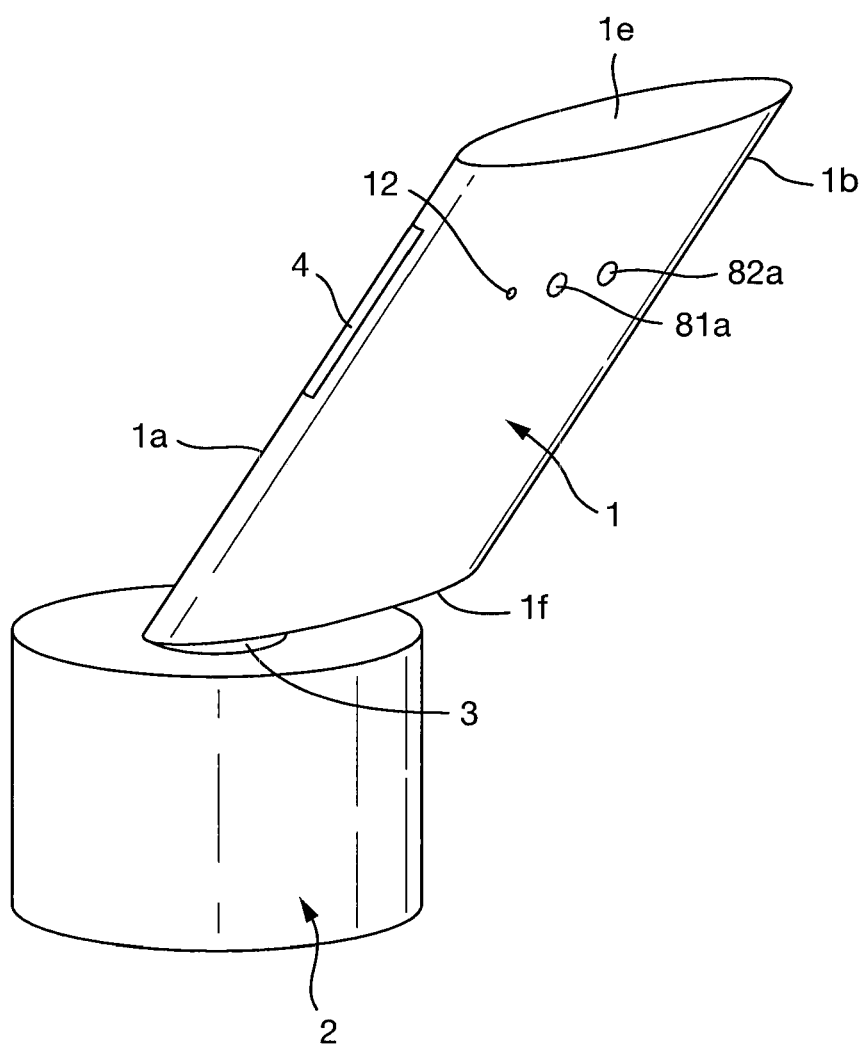
FIG. 5 is a perspective view of the moving-vane angle of attack probe of FIG. 4.

The construction and de-icing system of the embodiment of FIGS. 1 to 3B will now be discussed in more detail with reference to FIG. 4. FIG. 4 shows a multi-piece construction of a second embodiment of the invention. The features of the second embodiment not present in the first embodiment will be discussed in more detail below, however the general principles of the construction of the second embodiment, and the de-icing system are the same as in the first embodiment, and it is these that will now be discussed.

It is imperative that, in use, the vane 1 and in particular the pitot-tube are de-iced. In the present embodiment, the vane 1 is formed from three distinct parts. First and second vane parts 101c, 101d form the first and second vane surfaces 1c, 1d respectively. A third vane part 101a is made up of the leading and trailing edges 1a, 1b; top edge 1e; bottom surface 1f; pivot attachment flange 3a; and the integrally formed opening 4, interior chamber 5, exhaust opening 6, pitot-tube 8 and tube 10c. The first and second vane parts 101c, 101d are placed on respective sides of the third vane part 101a to form the vane 1.

The de-icing system comprises first and second foil heaters 210a, 210b which line the underside of the first and second vane parts 101c, 101d, i.e. the first and second vane surfaces 1c, 1d, respectively. The de-icing system further comprises first and second ceramic heaters 211a, 211b which sit on either side of the third vane part 101a, facing the underside of the first and second vane parts respectively. Specifically, the ceramic heaters extend over the area of the interior chamber, adjacent to the third and fourth interior walls 5c, 5d, respectively. Each of the heaters is connected via wires (not shown) through the pivot into the electronics assembly. When assembled, the ceramic heaters 211a, 211b are located in cut-outs 210c, 210d in the foil heaters 210a, 210b. This arrangement of heaters is particularly advantageous for reducing the energy required for de-icing the vane 1.

The first embodiment represents an integrated sensor for determining both the angle of attack, based on the rotational position of the vane, and the total pressure, based on the air pressure in the pitot-tube 8. While it is advantageous to integrate these two sensors into a single assembly, in order to calculate, for example, the Mach number, the static pressure as well as the total pressure must be known. It is therefore particularly advantageous for the moving-vane angle of attack probe to further include static pressure sensors.

The second embodiment of the invention, shown in FIGS. 4 to 7B, will now be described. The embodiment of FIGS. 4 to 7B is largely the same as the embodiment of FIGS. 1 to 3B, and the same reference numerals for identical features will be adhered to. The moving-vane angle of attack probe of this embodiment differs in that a pitot-static system is incorporated into the vane rather than a pitot-tube. The pitot-static tube is largely the same as the pitot-tube 8 of the first embodiment, but additionally includes a first and preferably a second static pressure system 81, 82.

The static pressure systems are ideally to be used to determine the freestream pressure, which is the air pressure upstream of the vane, i.e. before the air pressure has been affected by the movement of an aerodynamic body. However, in reality the static pressure in the region of the vane will be affected by a number of factors. Firstly, the static pressure in the region of the vane will be affected by the movement of the body on which the vane is mounted, for example, the fuselage of a plane. Secondly, the static pressure in the region of the vane will be affected by the way in which the air flows over the vane itself. Finally, the static pressure in the region of the vane will be affected in a scenario in which the angle of the vane lags behind a change in wind direction. As described below, the second embodiment of the invention features a number of design considerations made to minimise or correct for these effects on the static pressure.

The first and second static pressure systems 81, 82 comprise first and second manifolds 81c, 82c respectively, which in this embodiment are located behind the rear wall 8d, internal to the rear end 8e of the pitot-tube 8 so that said manifolds 81c, 82c are isolated from the rest of the interior chamber 5. The manifolds are defined by a rectangular cut-out made in the rear end 8e, which is then closed on either side by the third and fourth interior chamber walls 5c, 5d. The manifolds each have dimensions of 4 mm×7 mm×15 mm. The first manifold 81c is located directly behind the rear wall 8d of the pitot-tube 8, and the second manifold 82c directly behind the first manifold 81c such that the pitot-tube opening 8c and the first and second manifolds 81c, 82c are located at substantially the same height between the top edge 1e and bottom surface of the vane 1f.

Each static pressure system 81, 82 further comprises a pair of static ports 81a, 81b, 82a, 82b. The first static pressure system 81 features a first static port 81a, which extends from the first vane surface 1c, through the vane to the third interior chamber wall 5c to connect the manifold to the atmosphere. The first static pressure system 81 further features a second static pressure port 81b which extends from the second vane surface 1d, through the vane to the fourth interior chamber wall 5d to connect the manifold to the atmosphere on the other side of the vane. Each of the first and second static ports 81a, 81b is a circular opening with diameter of approximately 2 mm. The second static pressure system 82 is constructed similarly to the first 81, with first and second static ports 82a, 82b on each side of the vane. By providing first and second static ports connecting each manifold to the atmosphere on either side of the vane, the air pressure in each manifold 81c, 82c is an average of the pressure on either side of the vane 1 and so the effects on the static pressure caused by the rotation of the vane lagging behind a change in wind direction is cancelled out.

It should also be noted that the static ports 81a, 81b, 82a, 82b are at substantially the same height between the top edge 1e and bottom surface of the vane 1f as the pitot-tube opening 8c. This is advantageous because any effects on the static pressure will be approximately equal for any pressure readings. Further, it is noted that in this embodiment, the pitot-static tube is located closer to the top edge 1e, than the bottom edge, which likely increases the distance between the sensors and a body on which the vane assembly is to be mounted, thereby reducing the effect of the body on the static pressure in the region of the pitot-static tube. While it is advantageous to place the sensors as far from the base as possible, this will not entirely remove the effect of the body on the static pressure. For the present embodiment, the remainder of the pressure defect caused by the body on which the vane is to be mounted must be corrected mathematically on a case-by-case basis depending on the aerodynamic properties of the body.

Each static pressure system 81, 82 further comprises a static pressure sensor port 110a, 110b located in the respective manifold 81c, 82c. Similarly to the pressure port 10, each static pressure sensor port 110a, 110b opens into the manifold from one of the third and fourth interior chamber walls 5c, 5d, and preferably all three ports 10, 110a, 110b open from the same one of the third and fourth interior chamber walls.

Each static pressure sensor port 110a, 110b communicates with a respective static pressure tube 110c, 110d, which is similar to the total-pressure tube 10a which connects to the total-pressure sensor port 10. The static pressure tubes each communicate the pressure in the manifold to a respective static pressure sensor 110e, 110f located in the electronics assembly 2. The static pressure tubes 110c, 110d extend from the interior chamber wall 5c, 5d, internal to the vane, to the pivot 3. The tubes pass through the centre of the pivot and into the electronics assembly 2. The tubes 110c, 110d each communicate the pressure in their respective manifold 81c, 82c to a respective static pressure sensor 110e, 110f which is located on the counterweight system 9.

Figure 7A:
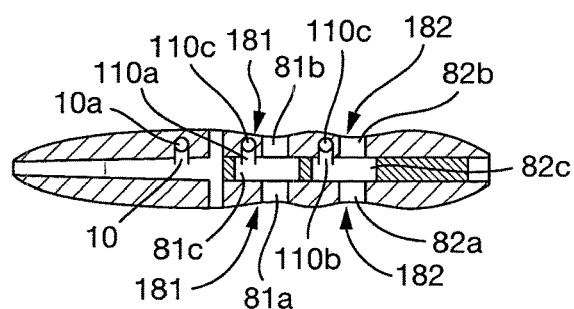
FIGS. 7A and 7B are cross-sectional and longitudinal sectional views respectively of the moving-vane angle of attack probe shown in FIGS. 4, 5 and 6A to 6C.
Figure 7B:
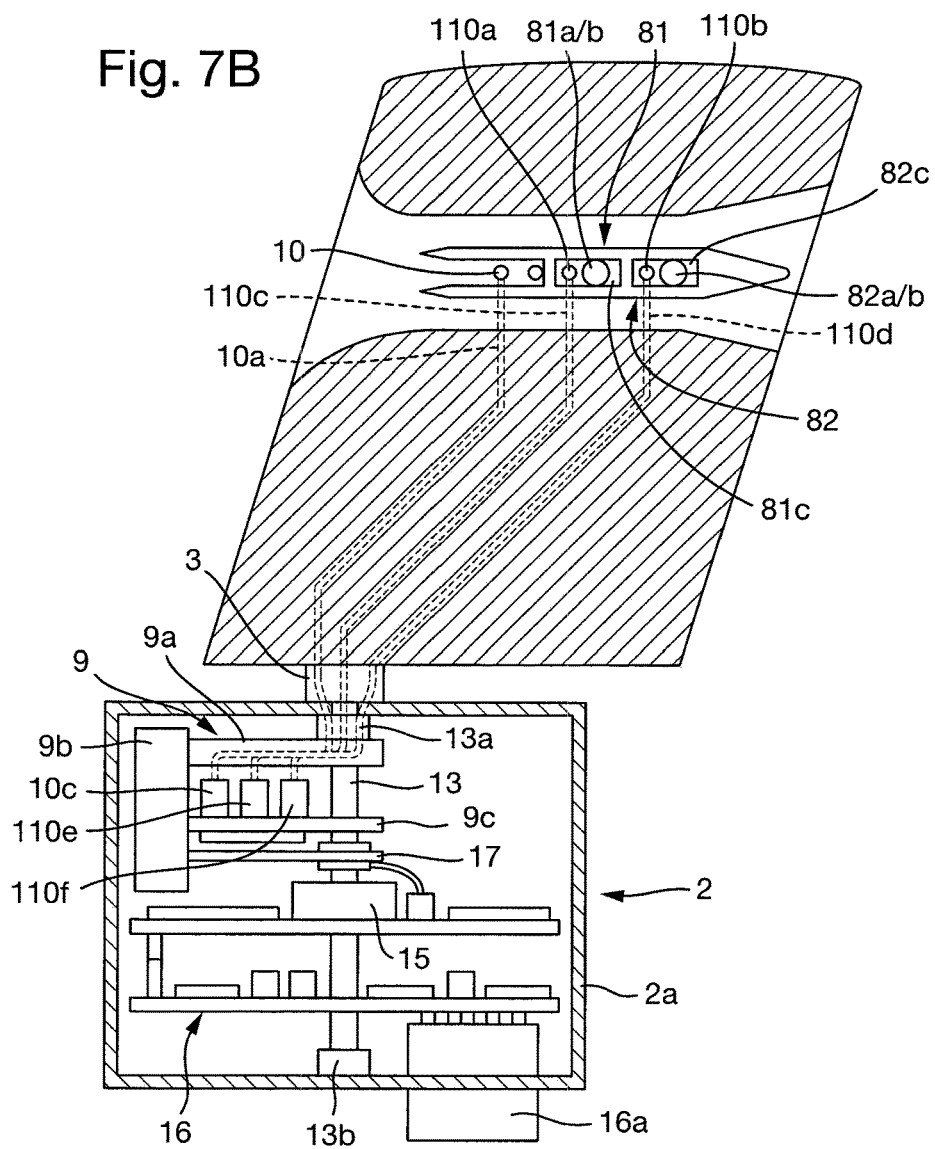
Figure 8:
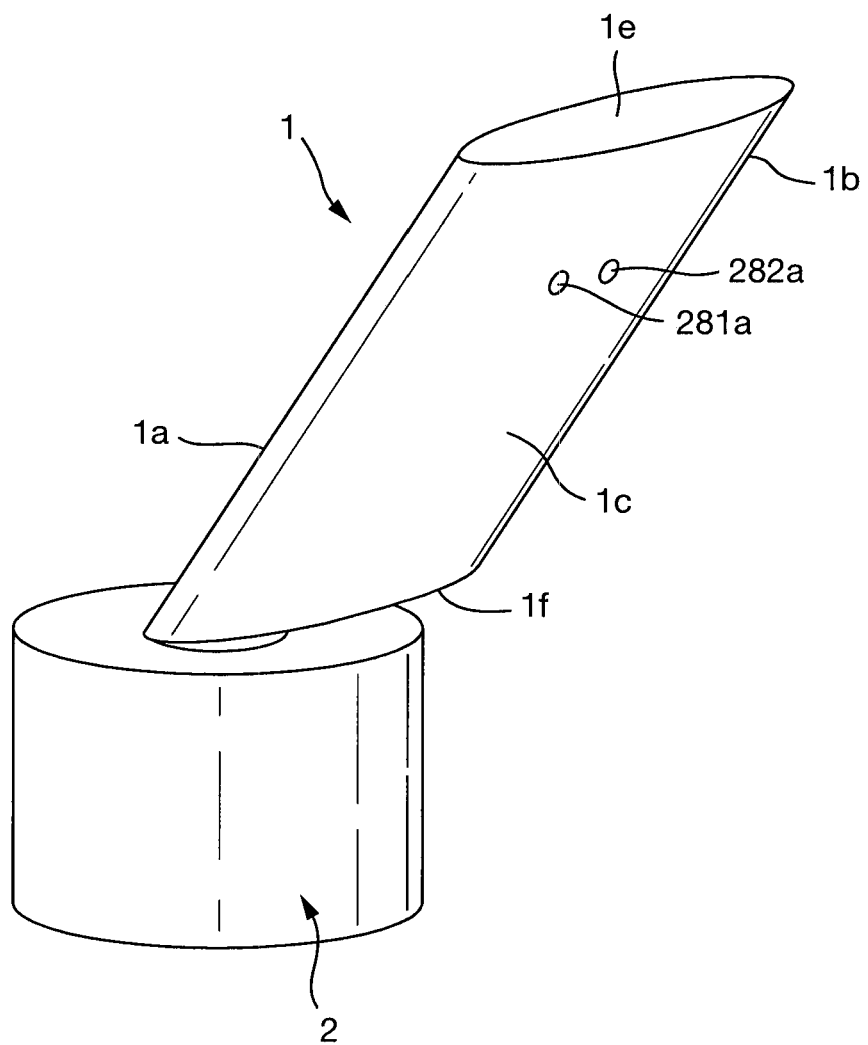
FIG. 8 is a perspective view of a moving-vane angle of attack probe according to a third embodiment.

As can be seen in FIG. 7A, the counterweight system 9 now has three pressure sensors 10c, 110e, 110f located on the counterweight arm 9a. In this embodiment, the pressure sensors are spaced along the counterweight arm at different radial distances from the shaft 13. Each pressure sensor determines the air pressure at their respective total-pressure or static pressure sensor port(s), with each reading being passed to the air-data computer 16 via slip rings 17.

As mentioned above, the static pressure in the region of the vane 1 will also be affected by the shape of the vane itself. Specifically, as the leading edge deflects air around the vane, the static pressure at the first and second vane surfaces 1c, 1d will be reduced with respect to the freestream pressure. While it is possible to correct for this pressure reduction mathematically, this is made difficult, in part because a defect caused by the aerodynamic body on which the vane is to be mounted must also be corrected mathematically. In this embodiment, the vane is shaped to counteract this reduction in pressure and to correct for the pressure defect by design.

As shown in particular in FIG. 7A, the first and second vane surfaces are shaped such that each static port 81a, 811b, 82a, 82b opens through the first or second vane surface 1c, 1d at the bottom of a shallow depression. Each depression corresponds to a separate groove 181, 182 formed in the surface of the vane, with each groove running up the vane between the bottom edge if and top edge 1e. Each vane surface 1c, 1d therefore has two shallow grooves 181, 182 corresponding to each static port. The precise width of each groove, depth of each groove, and angle each groove makes with the axis of rotation is selected aerodynamically to correct for the pressure defect caused by the shape of the vane at the position of each static port 81a, 81b, 82a, 82b. These grooves will remove this defect for all airflow speeds, and leave only a defect due to the aerodynamic body on which the vane is to be mounted requiring mathematical correction. In this embodiment, the vane dimensions are the same as in the first embodiment, and groove dimensions of length 115 mm (measured parallel to the leading edge), depth 1 mm, and width 15 mm (measured along the chord of the vane) were found to correct for the shape of the vane.

Figure 11:
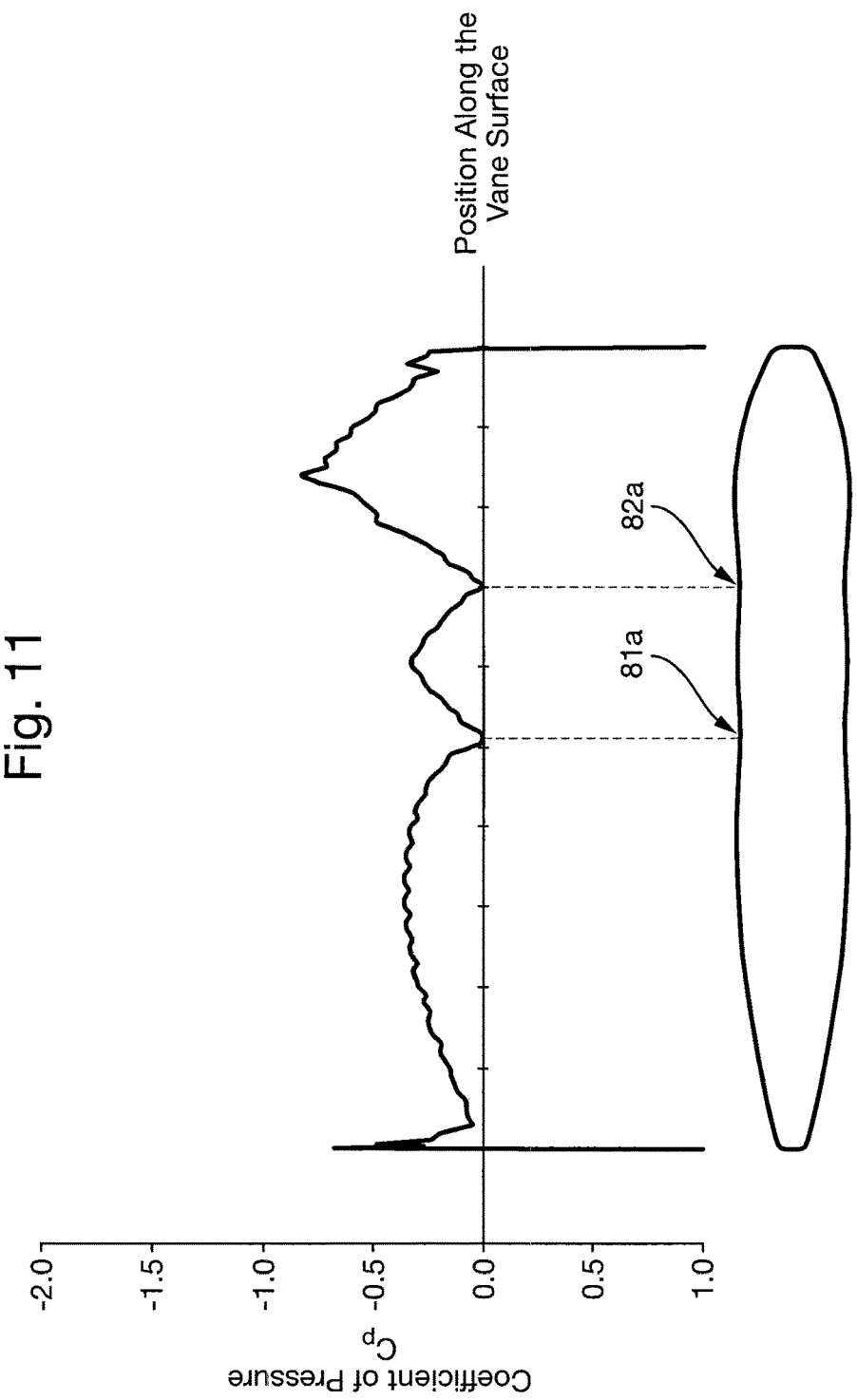
FIG. 11 is a graph showing the coefficient of pressure at points along one side of the moving-vane angle of attack probes shown in FIGS. 4 to 10B.

FIG. 11 is a graph showing how the shaping of the vane affects the coefficient of pressure at points along the surface of the vane. This demonstrates that the depressions, and placement of static ports within the depressions, can be configured such that the coefficient of pressure is approximately zero in the region of each static port.

In a third embodiment of the invention, a vane is provided with the first and second static pressure systems only, as shown in FIGS. 8 to 10B.

In this embodiment, the vane is of substantially the same external shape as in the first two embodiments, but does not have an opening, interior chamber, or exhaust opening. In this embodiment, the first and second static pressure systems 281, 282 comprise first and second manifolds 281c, 282c respectively. The first and second manifolds are cuboidal chambers located inside the vane.

Each static pressure system 281, 282 further comprises a pair of static ports 281a, 281b, 282a, 282b. The first static pressure system 281 features a first static port 281a, which extends from the first vane surface 1c, through the vane to the first manifold, thereby connecting it to the atmosphere. The first static pressure system 281 further features a second static pressure port 281b which extends from the second vane surface 1d, through the vane to the first manifold, thereby connecting it to the atmosphere on the other side of the vane.

The second static pressure system 282 is constructed similarly to the first 281, with first and second static ports 282a, 282b on each side of the vane. By providing first and second static ports connecting each manifold to the atmosphere on either side of the vane, the air pressure in each manifold 281c, 282c is an average of the pressure on either side of the vane 1 and so the effects on the static pressure caused by the rotation of the vane lagging behind a change in wind direction is cancelled out.

It should also be noted that the static ports 281a, 281b, 282a, 282b are at substantially the same height between the top edge 1e and bottom edge of the vane 1f, i.e. both are approximately 80 mm above the bottom edge of the vane. This is advantageous because any effects on the static pressure caused by an aerodynamic body to which the vane is mounted will be approximately equal. Further, it is noted that in this embodiment, the static ports 281a, 281b, 282a, 282b are located closer to the top edge 1e, than the bottom edge, which likely increases the distance between the static ports and a body on which the vane assembly is to be mounted, thereby reducing the effect of the body on any pressure readings. While it is advantageous to place the static ports as far from the base as possible, this will not entirely remove the effect of the body on the static pressure. As in the second embodiment, the remainder of the pressure defect caused by the body on which the vane is to be mounted must be corrected mathematically on a case-by-case basis depending on the aerodynamic properties of the body.

Each static pressure system 281, 282 further comprises a static pressure sensor port 210a, 210b located in the respective manifold 281c, 282c. Each static pressure sensor port 210a, 210b opens into the respective manifold through one of the manifold walls.

As in the second embodiment, each static pressure sensor port 210a, 210b communicates with a respective static pressure tube 210c, 210d. The static pressure tubes each communicate the pressure in the manifold to a respective static pressure sensor 210e, 210f located in the electronics assembly 2. The static pressure tubes 210c, 210d extend from the respective manifold, internal to the vane, to the pivot 3. The tubes pass through the centre of the pivot and into the electronics assembly 2. The tubes 210c, 210d each communicate the pressure in their respective manifold 281c, 282c to a respective static pressure sensor 210e, 210f which is located on the counterweight system 9.

Figure 10A:
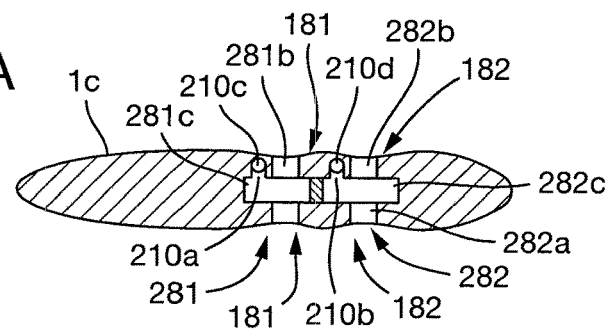
FIGS. 10A and 10B are cross-sectional and longitudinal sectional views respectively of the moving-vane angle of attack probe shown in FIGS. 8, and 9A to 9C.
Figure 10B:
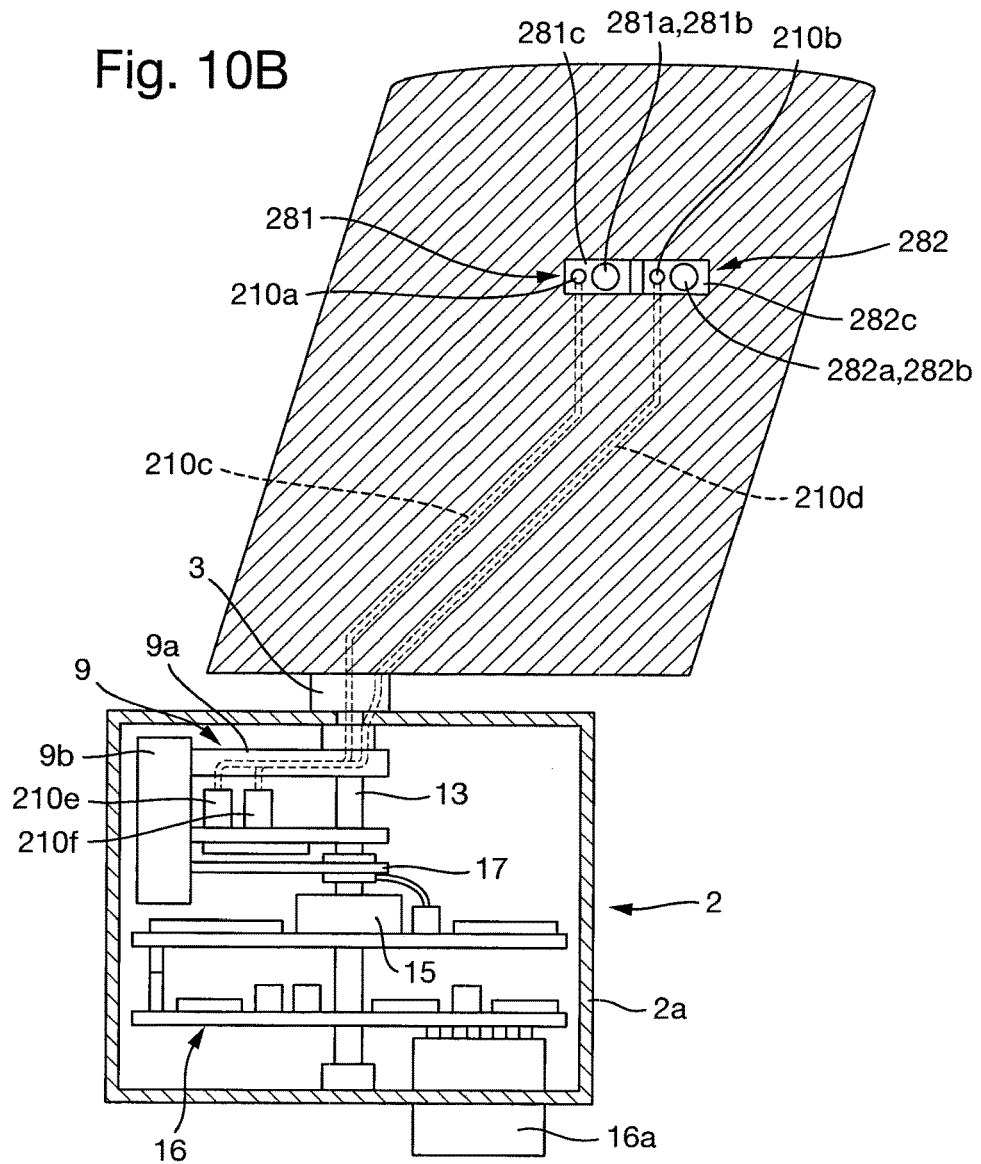

As can be seen in FIG. 10A, the counterweight system 9 now has two pressure sensors 210e, 210f located on the counterweight arm 9a. In this embodiment, the pressure sensors are spaced along the counterweight arm at different radial distances from the shaft 13. Each pressure sensor determines the air pressure at their respective static pressure sensor ports, with each reading being passed to the air-data computer 16 via slip rings 17.

As mentioned above, the static pressure in the region of the vane 1 will also be affected by the shape of the vane itself. Specifically, as the leading edge deflects air around the vane, the static pressure at the first and second vane surfaces 1c, 1d will be reduced with respect to the freestream pressure. While it is possible to correct for this pressure reduction mathematically, this is made difficult, in part because a defect caused by the aerodynamic body on which the vane is to be mounted must also be corrected mathematically. In this embodiment, the vane is shaped to counteract the reduction in pressure caused by the vane itself, thereby correcting for this pressure defect by design.

As shown in particular in FIG. 10A, the first and second vane surfaces are shaped such that each static port 281a, 282a opens through the first or second vane surface 1c, 1d at the bottom of a shallow depression. Each depression corresponds to a separate groove 181, 182 formed in the surface of the vane, with each groove running up the vane between the bottom edge 1f and top edge 1e. Each vane surface 1c, 1d therefore has two shallow grooves 181, 182 corresponding to each static port. The precise width of each groove, depth of each groove, and angle each groove makes with the axis of rotation is selected to aerodynamically correct for the pressure defect caused by the shape of the vane at the position of each static port 281a, 282a. These grooves will remove this defect for all airflow speeds, and leave only a defect due to the aerodynamic body on which the vane is to be mounted requiring mathematical correction. Grooves shaped and positioned as described with reference to the second embodiment were found to correct for the static pressure defect caused by the air flowing over the vane.

The invention claimed is:

1. A moving-vane angle of attack probe comprising:
   a vane having opposed first and second vane surfaces that define a leading edge and a trailing edge, the first and second vane surfaces, each extending between the leading edge and the trailing edge;
   a first vane opening located on the leading edge;
   at least one exhaust opening;
   a vane conduit extending between the first vane opening and the exhaust opening such that the first vane opening and the exhaust opening are in fluid communication, the vane conduit defining at least an interior chamber between the first and second vane surfaces; and
   a pitot-tube located within the interior chamber such that in use it receives air that enters the interior chamber via the first vane opening.

2. A moving-vane angle of attack probe according to claim 1, wherein at least a portion of the vane conduit comprises an upper interior chamber wall, a lower interior chamber wall, a first interior chamber sidewall and a second interior chamber sidewall which together define the interior chamber.

3. A moving-vane angle of attack probe according to claim 2, wherein the exhaust opening is located on the trailing edge, and wherein at least one of the upper interior chamber wall, lower interior chamber wall, first interior chamber sidewall and second interior chamber sidewall extends to the trailing edge.

4. A moving-vane angle of attack probe according to claim 1, wherein the first vane opening is a slot opening configured to extend along the leading edge.

5. A moving-vane angle of attack probe according to claim 2, wherein the pitot-tube comprises:
- a first shielding wall extending substantially between the first and second sidewalls of the interior chamber;
- a second shielding wall extending substantially between the first and second sidewalls of the interior chamber, wherein the first shielding wall and the second shielding wall are spaced apart from each other to define a first sensor opening therebetween;
- a rear wall extending between the first shielding wall and the second shielding wall, and substantially between the first and second sidewalls of the interior chamber; and
- a first pressure conduit located between the first sensor opening and the rear wall, wherein the first pressure conduit is configured to transmit a pressure between the first and second shielding walls.

6. A moving-vane angle of attack probe according to claim 5, wherein the first sensor opening faces the first vane opening.

7. A moving-vane angle of attack probe according to claim 5, wherein first and second bypass channels are defined between the first shielding wall and the lower interior chamber wall, and the second shielding wall and the upper interior chamber wall respectively, and wherein the bypass channels are configured such that, in use, a portion of the air that enters the interior chamber is directed along the first and second bypass channels without entering the pitot-tube.

8. A moving-vane angle of attack probe according to claim 1, wherein the leading edge is at an angle to an axis of rotation of the vane.

9. A moving-vane angle of attack probe according to claim 1, wherein the vane conduit tapers inwardly as it extends from the vane opening.

10. A moving-vane angle of attack probe according to claim 1, further comprising at least a first static pressure system, said first static pressure system comprising at least a first static pressure port that opens through one of the first and second vane surfaces, and a first static pressure conduit in fluid communication with the first static pressure port.

11. A moving-vane angle of attack probe according to claim 10, wherein the first static pressure system further comprises a first manifold internal to the vane, wherein the first static pressure port is configured to open into the first manifold, wherein the first static pressure conduit is configured to open into the first manifold, and wherein the first static pressure conduit is configured to transmit a static pressure in the first manifold.

12. A moving-vane angle of attack probe according to claim 11 wherein the first static pressure system further comprises a second static pressure port, and wherein the first static pressure port opens through the first vane surface, and the second static pressure port opens through the second vane surface, and wherein the second static pressure port opens into the first manifold.

13. A moving-vane angle of attack probe according to claim 10, further comprising a second static pressure system, wherein the second static pressure system comprises a third static pressure port that opens through one of the first and second vane surfaces, and a second static pressure conduit in fluid communication with the third static pressure port.

14. A moving-vane angle of attack probe according to claim 10, wherein at least the first static pressure port is located in a depression in the first or second vane surface, and wherein preferably each static pressure port is located in a separate depression in the first or second vane surface.

15. A moving-vane angle of attack probe according to claim 1, further comprising an electronics assembly for taking angle of attack and/or pressure readings, the electronics assembly having an external housing, wherein the vane is connected to the electronics assembly external housing by a pivot, and wherein the vane is configured to rotate relative to the electronics assembly external housing.

16. A moving-vane angle of attack probe according to claim 15, further comprising a counterweight system located inside the electronics assembly external housing, wherein the counterweight system is fixedly connected to the vane through the pivot, and wherein the first conduit is configured to transmit the pressure between the first and second shielding walls through the pivot and to a first pressure sensor located on the counterweight system in the electronics assembly external housing.

17. A moving-vane angle of attack probe comprising:
- a vane having opposed first and second vane surfaces that define a leading edge and a trailing edge, the first and second vane surfaces, each extending between the leading edge and the trailing edge;
- a first depression formed in the first vane surface; and
- a first static pressure system, said first static pressure system comprising at least a first static pressure port configured to open through said first vane surface in the region of said first depression, and a first static pressure conduit configured to transmit a static pressure;
- wherein the first depression is configured such that, in use, air flowing over said first vane surface undergoes a change in pressure in the region of said first static pressure port.

18. A moving-vane angle of attack probe according to claim 17, wherein the first static pressure system further comprises a first manifold internal to the vane, wherein the first static pressure port is configured to open into the first manifold, and wherein the first static pressure conduit is configured to open into the first manifold and configured to transmit a static pressure in the first manifold.

19. A moving-vane angle of attack probe according to claim 18, further comprising a second depression formed in the second vane surface, wherein the first static pressure system further comprises a second static pressure port configured to open through said second vane surface in the region of said second depression, and wherein the second depression is configured such that, in use, air flowing over said second vane surface undergoes a change in pressure in the region of said second static pressure port.

20. A moving-vane angle of attack probe according to claim 17, further comprising a third depression in either the first or second vane surface, and a second static pressure system, said second static pressure system comprising at least a third static pressure port configured to open through either the first or second vane surface in the region of said third depression, wherein the third depression is configured such that, in use, air flowing over said first or second vane surface undergoes a change in pressure in the region of said third static pressure port.

* * * * *